United States Patent [19]
Herving

[11] Patent Number: 5,249,777
[45] Date of Patent: Oct. 5, 1993

[54] PORTABLE WINCH

[76] Inventor: Ken-Y. H. Herving, Ornveien 1, N-8500 Narvik, Norway

[21] Appl. No.: 768,238
[22] PCT Filed: Apr. 17, 1990
[86] PCT No.: PCT/NO90/00065
  § 371 Date: Oct. 17, 1991
  § 102(e) Date: Oct. 17, 1991
[87] PCT Pub. No.: WO90/12751
  PCT Pub. Date: Nov. 1, 1990

[30] Foreign Application Priority Data

Apr. 17, 1989 [NO] Norway .................. 891559

[51] Int. Cl.⁵ .................. B66D 1/14; B66D 1/26
[52] U.S. Cl. .................. 254/289; 254/296; 254/300
[58] Field of Search .............. 254/214, 220, 222, 224, 254/289, 296, 299, 300, 310, 318, 330, 331, 343, 347, 362

[56] References Cited

U.S. PATENT DOCUMENTS

| | | | |
|---|---|---|---|
| 429,404 | 6/1890 | Andrews | 254/296 |
| 819,140 | 5/1906 | Hunt et al. | 254/296 |
| 1,740,694 | 12/1929 | Holmes . | |
| 1,792,093 | 2/1931 | Holmes . | |
| 1,816,654 | 7/1931 | Powers | 254/310 X |
| 2,537,403 | 1/1951 | Gahagan . | |
| 2,810,979 | 10/1957 | Puretic . | |
| 3,005,357 | 10/1961 | Christian | 254/362 X |
| 4,231,551 | 11/1980 | Ikeda | 254/362 X |
| 4,909,482 | 3/1990 | Hofmann et al. | 254/362 X |
| 5,002,259 | 3/1991 | Manning et al. | 254/358 X |

FOREIGN PATENT DOCUMENTS

| | | |
|---|---|---|
| 2240640 | 2/1974 | Fed. Rep. of Germany . |
| 105736 | 3/1965 | Norway . |
| 116392 | 3/1969 | Norway . |
| 118014 | 10/1969 | Norway . |
| 144189 | 4/1981 | Norway . |
| 833660 | 4/1960 | United Kingdom . |
| 1353607 | 5/1974 | United Kingdom . |
| 1405172 | 9/1975 | United Kingdom . |

*Primary Examiner*—Joseph J. Hail, III
*Attorney, Agent, or Firm*—Birch, Stewart, Kolasch & Birch

[57] ABSTRACT

A portable winch includes a frame, a drum supported by the frame, and a motor for rotating the drum via a transmission. Each end portion of the drum extends into and is rotatably supported by respective annular bearing portions of the frame. Another portion of the frame extends into the drum from one end thereof substantially parallel to the longitudinal axis of the drum, supporting the motor and the transmission which are within the drum, an output shaft of the transmission being detachably connected to the drum at the other end thereof.

6 Claims, 4 Drawing Sheets

PORTABLE WINCH

BACKGROUND OF THE INVENTION

1. Field of the Invention

The invention relates to a portable winch with a frame, a drum means which is mounted in said frame, and a driving means for rotation of said drum means, via a transmission.

2. Description of the Related Art

Portable manually operated capstans or winches are previously known. Utilization of such winches, e.g. for hauling up nets is, however, difficult because the person who operates the winch can only control the net with one hand. Even if hauling up of the net is carried out by two persons, one of whom operates the winch, operations will be slow and cumbersome due to the relatively low maximum physical strength of human beings.

Motor driven, mobile winches, e.g. crane trolleys and smaller power blocks for use on fishing craft are also known. Such devices may be more or less movable relative to a rail or about a carrying shaft, but such devices are neither especially compact, nor light-weight and are not suitable for being carried by one person.

SUMMARY OF THE INVENTION

It is an object of the invention to provide a winch or a capstan of the above mentioned kind which does not show the above mentioned disadvantages. The distinctive properties of the winch according to the invention will appear from the characterizing features stated in the following claims.

BRIEF DESCRIPTION OF THE DRAWINGS

The invention is disclosed in more detail below with reference to the drawing, which provides diagrammatical views of embodiments of a winch according to the invention.

DETAILED DESCRIPTION OF PREFERRED EMBODIMENTS

In the following disclosure it should be understood that the winch is placed in a position with the longitudinal axis of its drum extending horizontally, and that a right hand side and left hand side are in this context the right hand side, and left hand side, respectively, of the elevational view of FIG. 1.

Figure 1:
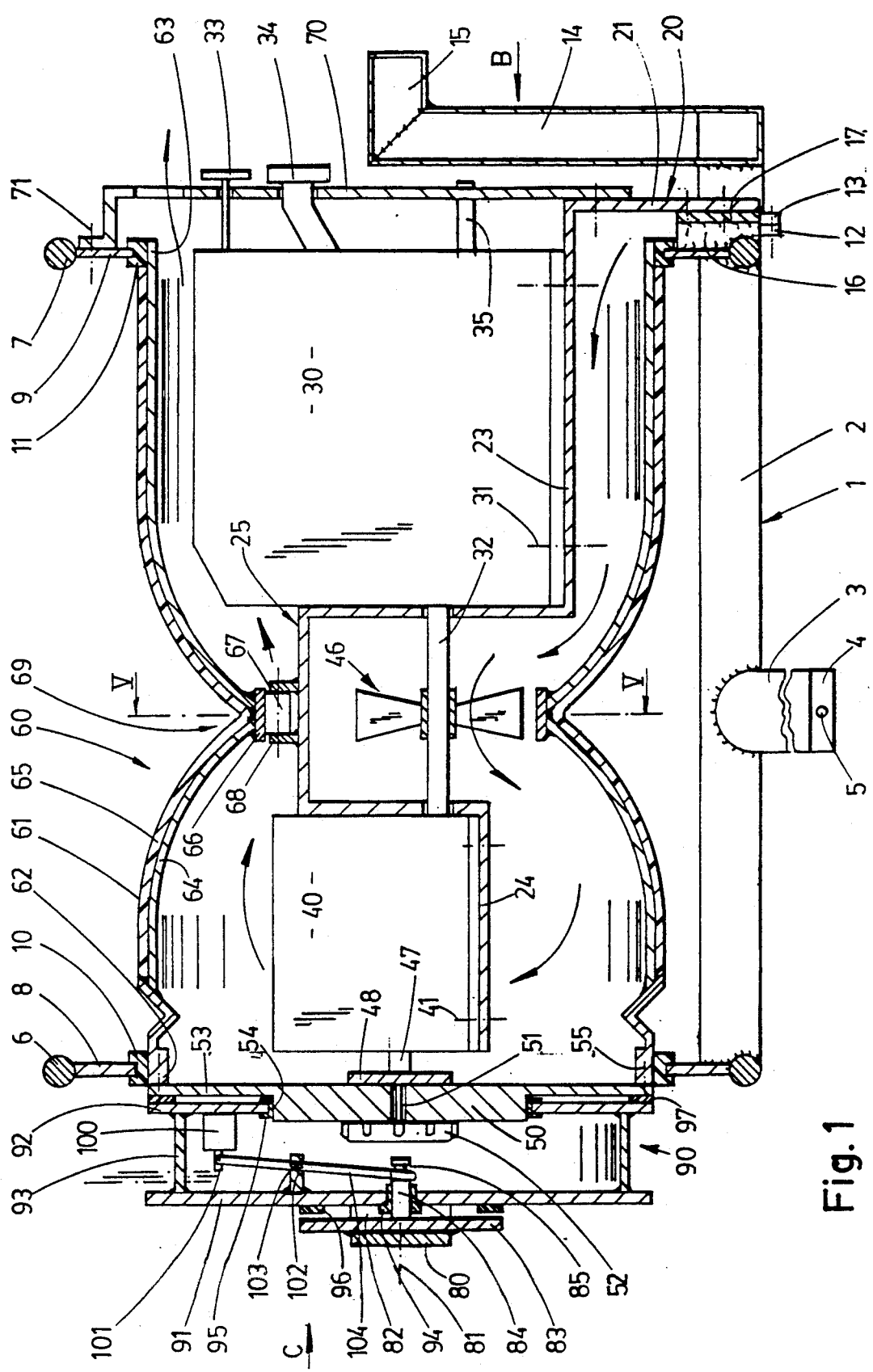
FIG. 1 is a longitudinal section according to line I—I in FIG. 2, through a winch according to the invention with a first embodiment of a drum means.
Figure 2:
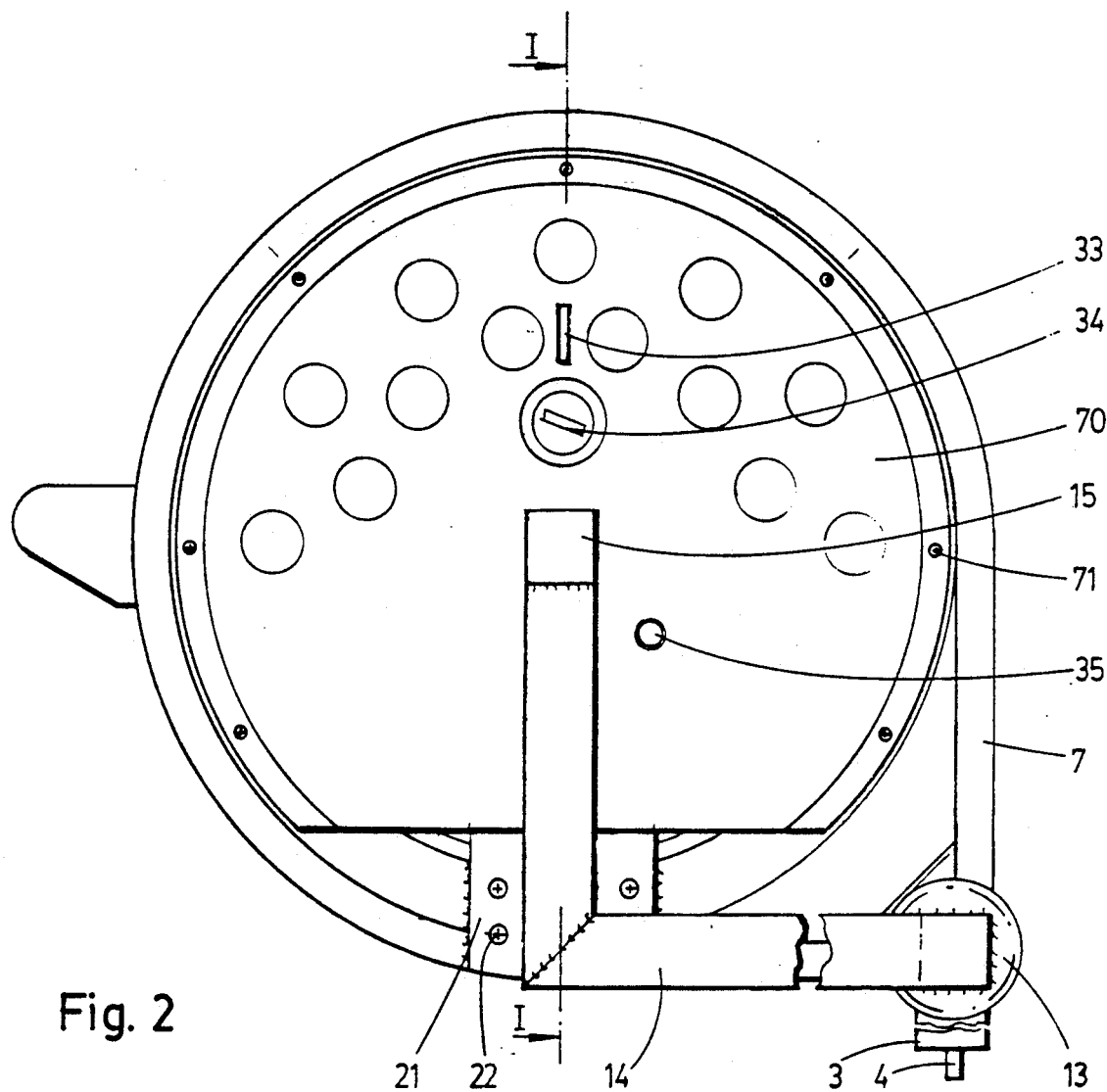
FIG. 2 is an elevational view of the winch shown in FIG. 1, as seen in the direction of arrow B.
Figure 3:
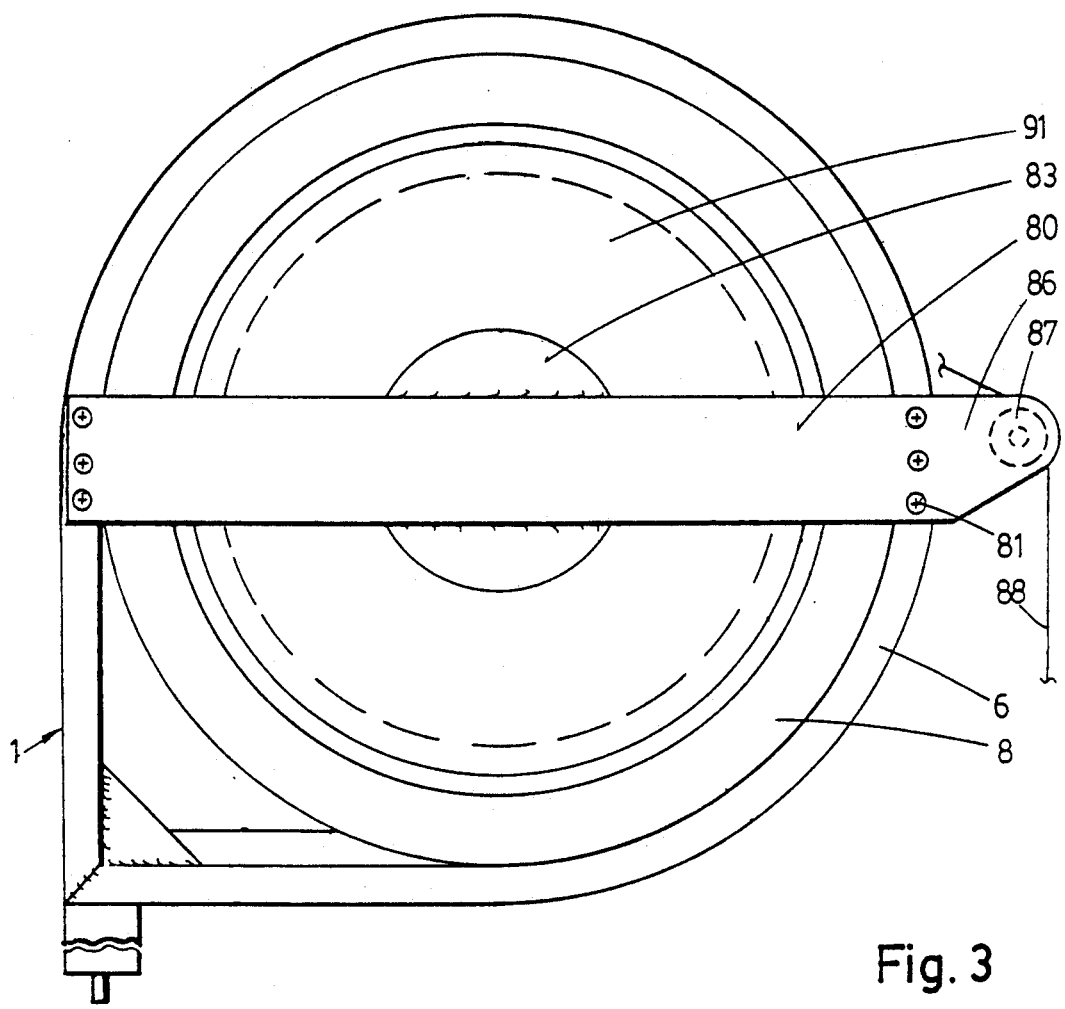
FIG. 3 is an elevational view of the winch shown in FIG. 1, as seen in the direction of arrow C.

As will appear from FIGS. 1, 2, and 3, the winch comprises a frame 1 with a horizontally extending main beam 2, with a tube-shaped profile. To its central portion a vertically depending pipe stub 3 is welded, and a flat profile 4 with a through hole 5 is welded to the latter.

A round profile 6 and 7, respectively, is welded to the end portions of main beam 2. Each round profile extends in the respective vertical plane and substantially circular upwards and horizontally in the same direction away from main beam 2 with a radially inward extending ring 8 and 9, respectively, made from a flat profile which is welded to each profile. Each radially inner edge of said rings carries a bearing ring 10 and 11, respectively, of a plastic material for example which is suitable for use as a slide bearing. On the other side of one ring 9 relative to the main beam a flange 12 is welded to the ring. To flange 12 a flange 13 of an arm 14 which is produced from a square tube and which extends to the common central axis of bearing rings 10, 11 is secured by the aid of screws. From this point a short pipe stub 15 extends away from the vertical plane of ring 9.

From the lower portion of right hand side ring 9 and right hand side round profile 7, two plate pieces 16 extend, which are welded to said members and onto which a vertically extending transverse plate 17 is welded.

Pipe stubs 3 and 15 are designed for telescopic insertion into associated pipes, which may be attached to a ship's side or the like for attachment of frame 1, the round pipe stubs 3 permitting rotation of the frame about the longitudinal axis of the pipe stub, whereas the square pipe or hollow profile 15 does not permit such rotation. A shackle bar, a hook, or the like may be inserted into hole 5 for suspending the frame from the same.

A vertical plate portion 21 of a bracket 20 is attached to transverse plate 17, by the aid of screws 22, and plate portion 21 extends radially inwards from transverse plate 17. At its radially innermost end, plate portion 21 is connected with a first horizontally extending plate portion 23. The latter extends towards the left hand side and the other end of frame 1 and, via a U-shaped bracket portion 25 at the central portion of the main beam, it is connected with another horizontally extending plate portion 24 of bracket 20.

On the fist, horizontally extending portion 23 of bracket 20 a motor 30 such as a piston motor with a driving shaft 32, is secured by screws 31, which are indicated by dash-dot-lines. The motor may be designed to be started by the aid of a pull cord with a handle 33, and it may be provided with a filling pipe 34 for fuel, and an exhaust pipe 35. Such a motor may, have an effect of approximately 2 kw and speed and feed of approximately 10,000 Rev./min.

Figure 4:
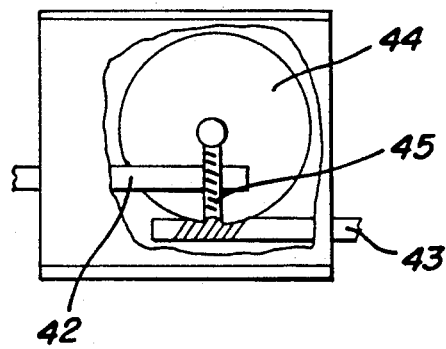
FIG. 4 is an elevational view of a gear and a sectional view of one wall of the gear case to show wheels and shafts that are provided in said case.

On the other horizontal portion 24 of bracket 20 a gear 40, which is driven by the aid of the motor shaft 32, is secured by the aid of screws 41, which are indicated by dash-dot-lines. This gear may be of the kind comprising two worms 42, 43, and two worm gears 44, 45, as shown in FIG. 4. In case of small and lightweight motors, and motors which have a relatively high effect and, thus, high rpm, such gears are well suited in this connection, because they permit a high reduction of rpm. The gear ratio may such as be approximately 130:1.

Centrally on motor shaft 32 a bushing with a fan 46 is secured by the aid of glue, the fan providing an air flow when the motor is operated, in order to cool motor 30 and gear 40, as indicated by arched arrows.

A flange 48 is provided on driving shaft 47 of the gear, and shaft 47 extends into a central orifice 51 in a circular end plate 50 which bears against flange 48 and is urged towards the flange by the aid of a wheel 52, which is screwed onto the threaded end portion of shaft 47. In a manner not shown, wheel 52 may be held on shaft 47 in various angular positions relative to the shaft, so that the force with which end plate 50 bears against flange 48 may be varied and the components, thus, form components of a slipping clutch known per se.

End plate 50 has a radially external circular portion 53 of reduced thickness to form a circular, axially extending step 54. The peripheral portion of the end plate is by the aid of screws, as indicated by dash-dot-lines, attached to one end portion of a horizontally extending main drum 61 of a drum means 60. Main drum 61 is rotatably suspended in frame 1 with its end portions 62, 63 designed to slide in bearing rings 10, and 11, respectively, of the frame. Axial movement of the drum relative to the frame is prevented by the fact that end plate 50 is firmly held on the driving shaft 47 of the gear.

The main drum is manufactured from a metal core 64, which has a rubber coating 65 to provide more friction between drum and fishing net, fishline, or the like which is to be hauled by the aid of the winch. The rubber coating may additionally be serrated or the like for this purpose. The rubber coating will also muffle the noise from the motor.

Figure 5:
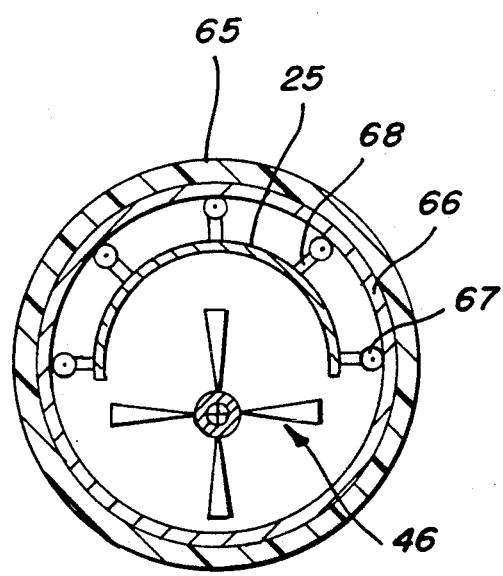
FIG. 5 is a sectional view according to line V—V through the drum of the winch as shown in FIG. 1.

In order to provide further support for the drum 61 a ring 66 may be welded to the inside of the central portion of metal core 64, the ring forming an external bearing path for a number of rollers 67, which are rotatably mounted on an associated pair of radially extending plate members 68, which are welded to the radially outermost side of the bottom of the U-shaped portion 25 of bracket 20, as shown in FIG. 5.

The drum has a tapered central portion 69 to make it suitable for hauling nets, which are then centered on the drum, and at one end a V-shaped groove is provided for hauling material such as fishing lines. Round profiles 6, 7, and rings 8, 9 will then act as guides for nets and line. A stocking or the like made of plastic, may be provided on outside profiles 65, 67.

By the aid of screws 71 an end cover 70 is secured on frame 1 to protect motor 30 against impacts and the like, and to protect the user against injuries due to hot portions of the motor.

As will appear from FIGS. 1 and 3, a horizontal carrier plate 80 extends on the left hand side of the frame and is, by the aid of screws 81, secured o horizontal and mutually diametrally arranged portions of round profile 6, via spacers 82. On the right hand side of the central portion of carrier plate 80 a circular flange 83 is welded to the plate and comprises a central journal 84 with a circular groove 85 in its end portion.

Vertical side walls 91, 92 of the lateral drum 90 with a cylindrical portion 93 are provided on journal 84, and step 54, respectively, of end plate 50 and are rotatably connected with said members, via plain bearing bushings 94, and 95, respectively, with the side drum also being displaceable axially to a limited degree. On the outside of vertical walls 91 92 of the side drum friction blocks or rings 96, and 97, respectively, are provided and are designed to be urged against peripheral portions of flange 83, and end plate 50, respectively, when the side drum is displaced axially, so that side drum 90 may be taken along and rotated by main drum 61 when the latter is rotated, or kept immobile.

A solenoid, an electrical actuator 100, or the like with a horizontally movable shaft 101 is attached to the inside of the right hand side vertical wall 92 of side drum 90. Between shaft 101 and journal 84 a carrying pipe stub 102, which has a pin 103 extending through an elongated hole in the central portion of a rocker arm 104 is attached to the inside of the other vertical wall 91. One end portion of rocker arm 104 is forked, having two tines which engage with the concentric groove 85 of journal 84, and the other end of rocker arm 104 has a flexible connection with shaft 101 also carrying a pin which extends through a hole in arm 104.

Movement of shaft 101 all the way towards the right hand side will, thus, cause the arm 104 to rock about journal 84 in a clockwise direction in FIG. 1 and the side drum to move towards the right hand side into contact with main drum 61, so that the side drum can be driven by the motor. Movement of shaft 101 all the way to the left hand side will cause movement of the side drum towards the left hand side into contact with flange 83, so that the side drum is prevented from rotation relative to frame 1. If shaft 101 is in an intermediate position, the side drum may, however, move freely.

This side drum 90 is especially suitable for winding up and paying out a bait or cheat bait fishing line ("juksa"). The electrical actuator is controlled in a manner not shown by the aid of an electronic programmable control unit (not shown), which is provided in the side drum and may be started by, for example, remote control based on infrared light, which may be received by the control unit in the side drum, via an opening in the latter.

A capacitive, inductive, or the like sensor (not shown), which is mounted on the side drum, is in a manner known per se designed to sense one or a plurality of permanent magnets on flange 83 passing, so that the control unit can receive signals depending on the rotation of the side drum. Side drum 90 is, thus, designed for cyclic movement controlled by the control unit, each cycle comprising movement towards the right hand side and rotation of the side drum by the main drum for a predetermined number of revolutions, whereupon the side drum is released until it is moved in the opposite direction for a predetermined number of revolutions. The number of revolutions may be even or odd numbers.

A horizontally extending roller 87 is rotatably connected with a portion of carrier plate 80 which projects radially outside side drum 90. When the side drum carries a fishing line 88 such as a bait fishing line which is placed about roller 87 and hangs down into the water, during such movement a predetermined portion of the line may, thus, be repeatedly be hauled up, whereupon a predetermined portion is every time paid out due to its own weight, so that a jigging movement of the line is achieved.

Figure 6:
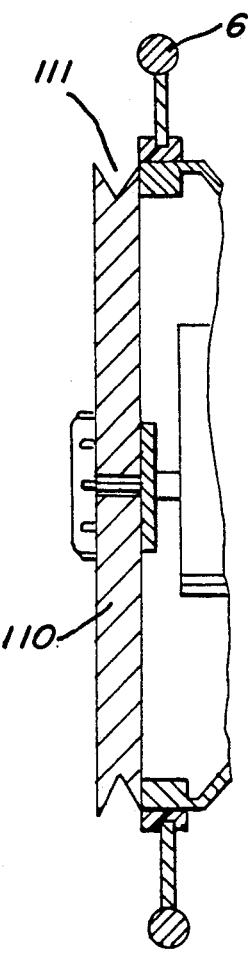
FIG. 6 is a longitudinal section through one end portion of another embodiment of a drum means for a winch according to the invention.

As shown in FIG. 6, instead of end plate 50 of the main drum, an end plate 110 with a radially V-shaped groove 111 opening outwards may be attached to the main drum for hauling a line. End plate 110, thus, forms a side drum and may, obviously, also be provided with a step 54 on which the cyclically moved side drum 90 is mounted.

The frame of the above disclosed winch may be produced from aluminium, and the drums may be produced from a reinforced plastic material. Furthermore, the motor may be a high-speed light-weight piston motor.

A portable winch is, thus, disclosed above the design of which ensures a compact and, especially, a very light-weight winch. The winch may, furthermore, be provided with a side drum which is suitable for bait fishing. Consequently, a portable means for such use is also provided.

The winch may be secured to a pipe which is firmly bolted to a boat's gunwale or it may be hooked onto a hook which may, in turn, be secured to a tree or the like for hauling logs, hauling small draft ashore, hoisting objects, hauling nets and the like.

I claim:

1. A portable light-weight winch comprising:
a frame;
a main drum supported by said frame; and
a motor for rotating said drum via a transmission;
wherein each end portion of the drum extends into and is rotatably supported by respective annular bearing portions of said frame,
another end portion of the frame extending into the main drum from one end thereof substantially parallel to the longitudinal axis of the main drum for supporting the motor and the transmission which are within the main drum, an output shaft of the transmission being detachable connected to the main drum at the other end thereof.

2. The winch according to claim 1, wherein the annular bearing portions of said frame comprise radially outer portions which are curved in longitudinal planes, radially outward and away from the central transverse plane of the main drum, thus constituting means for guiding a wire, fishing net or the like to the main drum, when the wire, fishing net or the like is to be hauled in by the winch.

3. The winch according to claim 1, wherein said main drum includes a side drum which is coaxially arranged and axially displaced relative to the main drum, and which is operatively connected with the adjacent end portion of said main drum.

4. The winch according to claim 3, wherein the side drum is carried by said main drum.

5. The winch according to claim 3, wherein the side drum is rotatably and separately mounted in said frame, and is operatively connected with said main drum via a coupling arrangement.

6. The winch according to claim 5, wherein the side drum includes control means for cyclic control of said coupling arrangement, each cycle including connection of the side drum with said main drum until it is rotated a predetermined number of revolutions, and disconnection of the side drum until it is rotated a predetermined number of revolutions in the opposite direction.

* * * * *